J. HOLTZMAN & L. GEFON.
GAS LIGHTER.
APPLICATION FILED APR. 10, 1912.
1,090,714.
Patented Mar. 17, 1914.
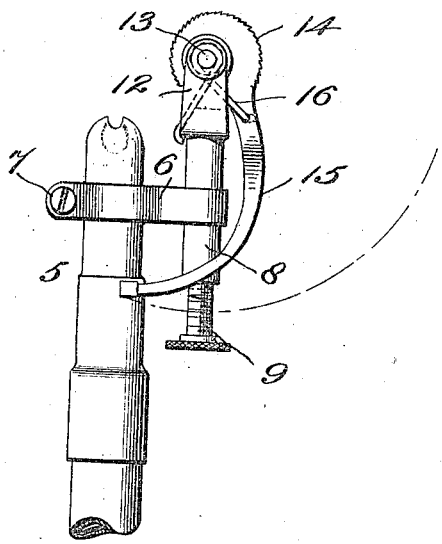
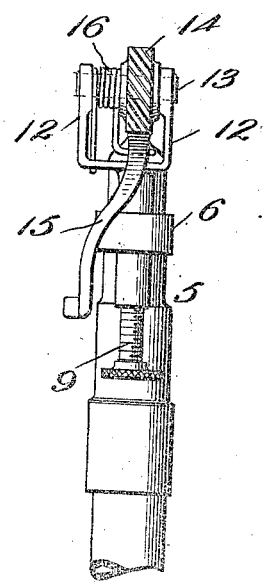
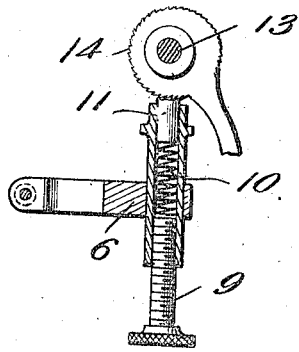
WITNESSES
INVENTORS
John Holtzman &
Louis Gefon
Victor J. Evans ATTORNEY

UNITED STATES PATENT OFFICE.

JOHN HOLTZMAN AND LOUIS GEFON, OF NEW YORK, N. Y.

GAS-LIGHTER.

1,090,714.  Specification of Letters Patent.  Patented Mar. 17, 1914.

Application filed April 10, 1912. Serial No. 689,894.

*To all whom it may concern:*

Be it known that we, JOHN HOLTZMAN and LOUIS GEFON, subjects of the Czar of Russia, residing at New York, in the county of New York and State of New York, have invented new and useful Improvements in Gas-Lighters, of which the following is a specification.

This invention relates to gas lighters and has for its object a simple automatic device adapted to be fitted at the upper end of the burner to create a spark to light the gas when turned on, and it consists of new and simple means which will be more fully described in the following specification, set forth in the claim and illustrated in the drawings, wherein, Figure 1 is a side elevation. Fig. 2 is an end view. Fig. 3 is a detail sectional view.

The device is clamped to the upper end of the burner 5 by means of the metal band 6 and set screw 7, the band carrying at its outer end a tube 8 threaded at its lower end to receive an adjusting screw. Within the tube and above the screw 9 is a spring 10, carrying on its upper end a block 11 of spark producing substance and extending upward from the tube 10 are arms 12 having a short shaft 13 journaled in their upper ends. This shaft 13 carries a cam 14 serrated on its edge and having a handle 15 projecting therefrom. As the handle is raised the serrations are carried across the block 11 and upon the downward movement of the handle 15, sparks are made and thrown toward the tip of the burner 5. As the handle 15 is moved upward, tension is created in a spring 16 which surrounds the shaft 13 and is connected with one arm 12 and with the handle 15, and as the handle is carried upward and released, the tension of the spring throws the arm downward to produce the desired result. The convolutions of the spring are interposed between the cam 14 and the adjacent arm 12 so as to form means for holding the cam in proper position with relation to the spark producing substance to insure maximizing the friction between the substance and the serrated edge of the cam.

As the block of spark producing substance becomes worn, the screw 9 may be so adjusted as to exert a pressure on same to create sufficient friction from the cam 14 to cause the sparking.

It is obvious that the parts may be otherwise arranged and applied to a gas burner without departing from the essential features above described.

What we claim as new is:—

A gas lighter comprising a support adapted to be secured to a burner, a cylinder provided upon the support and having spaced arms mounted at its end, a pyrophoric material resiliently supported in the cylinder between said arms, a serrated member journaled between the arms and having contact with the said material, a handle provided upon said member and a spring coiled about the axis of said member and engaging the member and being under tension to normally hold the free end of the handle upon the member toward the support.

In testimony whereof we affix our signatures in presence of two witnesses.

JOHN HOLTZMAN.
LOUIS GEFON.

Witnesses:
 JAMES T. DUHAMEL,
 THOS. H. FRIEND.